UNITED STATES PATENT OFFICE.

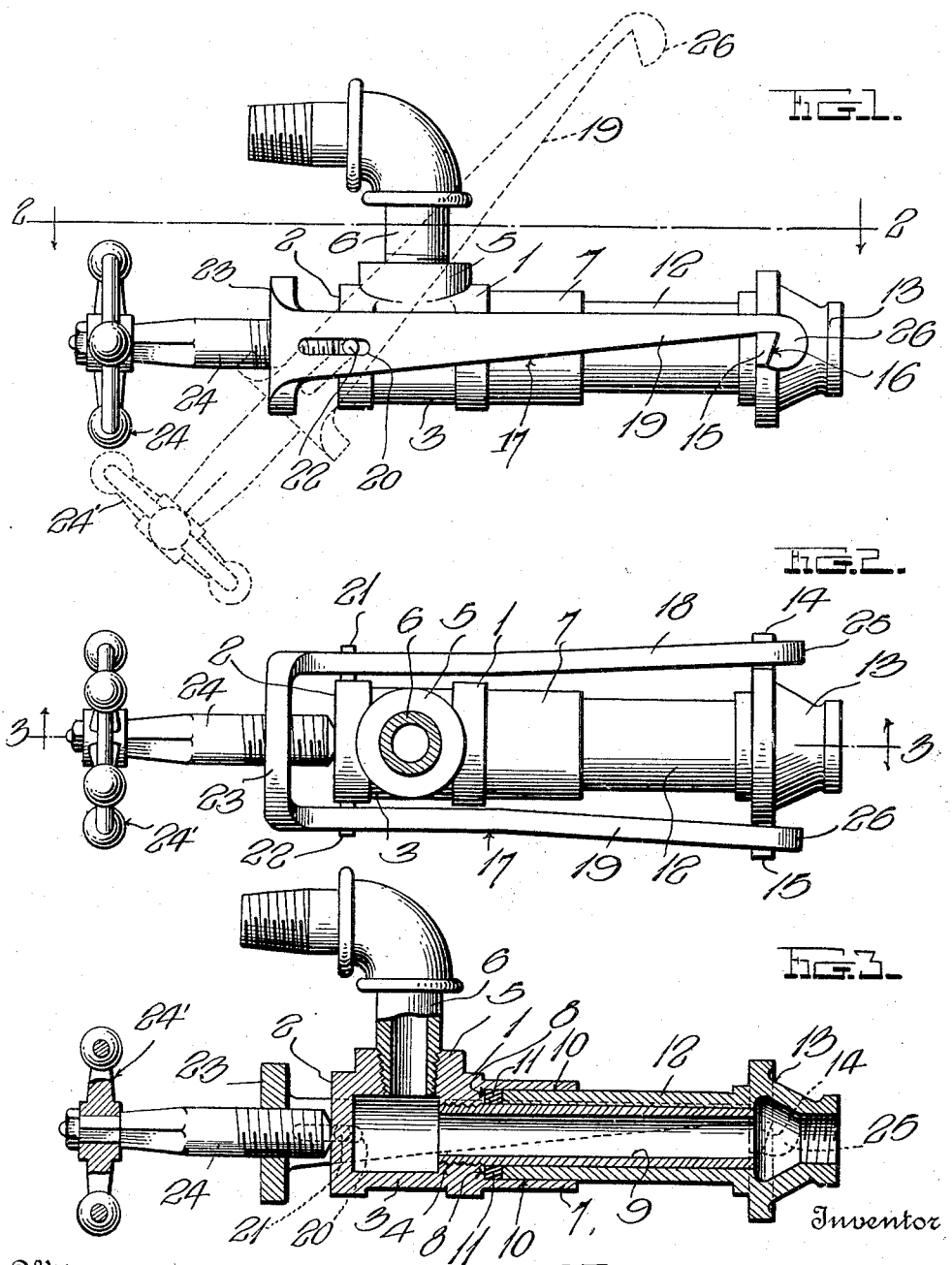

ARTHUR BONNEAU, OF HOUGHTON, MICHIGAN.

PIPE-COUPLING.

1,202,960.     Specification of Letters Patent.     Patented Oct. 31, 1916.

Application filed March 20, 1916. Serial No. 85,419.

*To all whom it may concern:*

Be it known that I, ARTHUR BONNEAU, a subject of the King of England, residing at Houghton, in the county of Houghton and State of Michigan, have invented certain new and useful Improvements in Pipe-Couplings; and I do declare the following to be a full, clear, and exact description of the invention, such as will enable others skilled in the art to which it appertains to make and use the same.

This invention relates to pipe couplings and more particularly to couplings for attaching a hose or steam pipe to a hydrant, boiler, steam drill, or the like.

The object of the invention is to provide a coupling of this character which may be employed for quickly applying or detaching a hose or other pipe without the use of a wrench or other tool and without any danger of the operator being burned while effecting the change.

With the above and other objects in view, the invention consists of certain novel features of construction, and the combination and arrangement of parts hereinafter fully described and claimed.

In the accompanying drawings: Figure 1 represents a side elevation of a coupling constructed in accordance with this invention with the parts thereof shown in clamped operative position in full lines, and the clamping yoke in released position in dotted lines; Fig. 2 is a horizontal section taken on the line 2—2 of Fig. 1 looking in the direction of the arrow; Fig. 3 is a longitudinal section taken on the line 3—3 of Fig. 2.

In the embodiment illustrated the coupling constituting this invention comprises a hollow male member 1 in the form of a T, one end 2 of the head 3 thereof being closed and the other end of said head open as shown at 4. The shank 5 of this coupling is also open and is internally threaded to receive an elbow or other pipe 6 adapted to be connected to a hose or other pipe. The open end 4 of this hollow male member 1 is provided with a longitudinally extending flange 7 having a shoulder 8 at its inner end resulting from making the bore of the flange greater than the bore of the end 4, for a purpose to be described. The inner face of this open end 4 of the coupling 1 is internally threaded to receive an exteriorly threaded end of a tubular extension 9 which is mounted in said open end 4 and has threaded engagement therewith, said member 9 being shown extending longitudinally some distance beyond the flange of the member 1 a pocket 10 being formed between its outer face and the inner face of said flange 7. A packing 11 is arranged in this pocket 10 at its inner end and is held against accidental displacement or loss by the walls of the pocket and is designed to form a fluid tight joint between the male and female members of the coupling. The female member 12 of this coupling is shown tubular in form throughout the greater portion of its length, being of a diameter to fit snugly over and engage the tubular extension 9 of the male member with its rear end disposed in the pocket 10 and engaged with the packing 11 thereof. The outer or front end of this member 12 is provided with a nipple 13 which is here shown internally threaded to adapt it for connection with a hydrant. Lugs 14 and 15 extend laterally from the opposite sides of the nipple 13 and have their front faces beveled inwardly as shown at 16 in Fig. 1, for a purpose to be described.

A yoke-shaped clamping member 17 has the side bars 18 and 19 thereof longitudinally slotted near their connected or inner ends as shown at 20, and is adapted to be pivotally and slidingly engaged with pins 21 and 22 which project laterally from opposite sides of the closed end of the male coupling member, said pins being shown substantially in longitudinal alinement when the parts are assembled with the lugs 14 and 15 carried by the female member. The cross bar 23 of this yoke-shaped member is designed to span the closed end of the male coupling and has a threaded aperture with which an adjusting or tightening screw 24 is engaged and which is designed to bear against the closed inner end of the male coupling when the screw is properly actuated.

The free ends of the side bars 18 and 19 are provided with hooks 25 and 26 which extend longitudinally inward toward the cross bar of the yoke and have their engaging faces beveled or inclined inwardly and forwardly to conform to the shape of the beveled faces 16 of the lugs 14 and 15 so that when said hooks are engaged with said lugs they are reliably held against disengagement.

In the use of this improved coupling the female member which is normally connected by its nipple 13 with a hydrant, boiler, steam drill, or other apparatus, is inserted in the pocket 10 of the male member with its end engaging the packing 11 disposed in said pocket 10. The male member 1 which is connected to a hose or steam pipe by the elbow 6, is secured to the female member by engaging the hooked ends of the yoke 17 with the lugs 14 and 15 of the female member and then screwing up the adjusting screw 24 by turning it in the required direction, said screw being shown provided with a handle or operating wheel 24' to facilitate the actuation thereof. It will thus be seen that when these hooks have been engaged with the lugs on the female member and the screw 24 turned inwardly against the closed end of the male member, the yoke-shaped clamping member will be forced outwardly away from said male member, which movement is permitted by the slot and pin connection of the yoke with said member and this movement of the yoke will draw the female member closely over the tubular extension 9 of the male member with the inner end of the female member pressed against the packing in the pocket 10, whereby a fluid tight joint is provided between said members. The extension 9 which preferably extends throughout the length of the body portion of the male member when the parts are assembled in addition to forming a guide for said member and as an inner wall for the packing receiving pocket, also performs the function of a reinforce for strengthening the coupling whereby the male member is practically double-walled when in operative position.

From the above description it will be obvious that the parts of this coupling may be quickly assembled or disassembled by simply turning the screw 24 in the desired direction for either loosening or tightening the clamping yoke, whereby the hooks at the free ends thereof are engaged or disengaged from the lugs 14 and 15 on the female member. This engagement of the yoke with the female member is accomplished by swinging said yoke laterally on the pivot pins 21 and 22, as shown in dotted lines in Fig. 1, and hence it will be obvious that no wrenches or other tools are necessary for either applying or removing the coupling.

I claim:—

In a pipe coupling the combination of a hollow male member open at one end and closed at the other and provided with an internally threaded opening in one side wall for connection with a pipe to be connected, the open end of said member having a flange extending longitudinally therefrom, the bore of the flange being greater in diameter than that of the bore of the end of said member, whereby a shoulder is formed at the inner end of its flange, said open end being internally threaded at the rear of said shoulder, a tubular extension member inserted in the open end of said hollow member and having threaded engagement therewith, the other end of said extension projecting in advance of the flange of said hollow member forming a pocket between the outer face thereof and the inner face of said flange, a packing disposed in said pocket, a female member fitting over and closely contacting with said tubular extension with one end extending into said packing containing pocket, a nipple at the outer end of said female member having oppositely disposed lugs on its outer face, a yoke-shaped clamping member having side bars, the said bars united to said male member by a pin and slot connection to allow for longitudinal and swinging movement of said yoke relatively to said member, the free ends of the side bars of said yoke having hooks for engagement with the lugs on said female member, and a yoke tightening and releasing screw extending through and having threaded engagement with the cross bar thereof with its inner end bearing on the closed end of said male member.

It testimony whereof I have hereunto set my hand in presence of two subscribing witnesses.

ARTHUR BONNEAU.

Witnesses:
LOUIS N. LEGRIS,
H. C. TROWBRIDGE.

Copies of this patent may be obtained for five cents each, by addressing the "Commissioner of Patents, Washington, D. C."